United States Patent [19]

Bailey

[11] 4,379,884
[45] Apr. 12, 1983

[54] COPOLYMER BLEND OF IMPROVED IMPACT RESISTANCE

[75] Inventor: Fay W. Bailey, Bartlesville, Okla.

[73] Assignee: Phillips Petroleum Company, Bartlesville, Okla.

[21] Appl. No.: 335,771

[22] Filed: Dec. 30, 1981

[51] Int. Cl.³ ............................................. C08L 53/02
[52] U.S. Cl. ..................................................... 525/96
[58] Field of Search ......................................... 525/96

[56] References Cited

U.S. PATENT DOCUMENTS

| 3,442,981 | 5/1969 | Stafford et al. | 525/96 |
| 3,574,151 | 4/1971 | Goto et al. | 260/4 |
| 3,584,081 | 6/1971 | Dasch | 260/893 |
| 3,649,716 | 3/1972 | Childers et al. | 260/893 |
| 3,789,084 | 1/1974 | Childers et al. | 260/892 |
| 3,928,494 | 12/1975 | Aliberti | 260/879 |
| 3,929,936 | 12/1975 | Davies et al. | 260/892 |
| 3,935,136 | 1/1976 | Childers et al. | 260/880 B |
| 3,985,827 | 10/1976 | Hicks | 426/106 |
| 4,288,399 | 9/1981 | Siedenstrang et al. | 525/96 |

Primary Examiner—Carman J. Seccuro

[57] ABSTRACT

A vinylarene-olefinically unsaturated nitrile copolymer, such as a styrene-acrylonitrile copolymer, is blended with a resinous conjugated diene-vinylarene copolymer, such as a butadiene-styrene copolymer, to improve the impact resistance of the latter.

13 Claims, No Drawings

COPOLYMER BLEND OF IMPROVED IMPACT RESISTANCE

This invention relates to a novel composition of matter comprising a blend of (a) a resinous, essentially non-elastomeric copolymer of conjugated diene and vinylarene and (b) a copolymer of vinylarene and olefinically unsaturated nitrile. This invention also relates to a method for improving the impact resistance of (a) by blending (a) with a small amount of (b).

The currently preferred blend of this invention comprises a butadiene-styrene copolymer and a small amount of a styrene-acrylonitrile copolymer. It has been discovered that the addition of a styrene-acrylonitrile copolymer to a resinous butadiene-styrene copolymer improves the impact resistance of the latter.

It is known in the prior art to improve the impact resistance of a styrene-acrylonitrile copolymer by adding a lesser amount of a butadiene-styrene copolymer. U.S. Pat. No. 3,584,081, for example, discloses a composition comprising 83–97 parts by weight of a styrene-acrylonitrile copolymer and 17–3 parts by weight of a butadiene-styrene copolymer.

The novelty of our invention resides in the unexpected discovery that a small amount of a styrene-acrylonitrile copolymer can be used to improve the impact resistance of a resinous butadiene-styrene copolymer. More specifically it has been discovered that the addition of up to 30 weight percent of a styrene-acrylonitrile copolymer can improve the impact resistance of a resinous butadiene-styrene copolymer. Broadly this invention contemplates the use of up to 30 weight percent of a copolymer of vinylarene and olefinically unsaturated nitrile to improve the impact resistance of a resinuous, essentially non-elastomeric copolymer of conjugated diene and vinylarene.

Accordingly it is an object of this invention to provide a polymer blend of improved impact resistance. A further object of this invention is to provide a method for improving the impact resistance of a resinous conjugated diene-vinylarene copolymer.

These and other objects and advantages of this invention will be made apparent from a study of this disclosure and the appended claims.

The resinous, non-elastomeric conjugated diene-vinylarene copolymers useful in the practice of this invention include the polymodal, radially branched block copolymers described in U.S. Pat. No. 3,639,517 and U.S. Pat. No. 4,091,053 and the linear block copolymers described in U.S. Pat. No. 4,080,407. The conjugated diene-vinylarene copolymers can also be mixtures of two or more solution polymerized copolymers such as those described in U.S. Pat. No. 4,051,197 or they can contain more than one diene comonomer as described in U.S. Pat. No. 4,120,915. All of the above patents are incorporated by reference.

It is generally preferred to use conjugated diene-monovinylarene copolymers prepared by employing an alkali metal-based initiator to copolymerize the monomers in a hydrocarbon diluent. The conjugated dienes generally preferred in the copolymerization are those of 4 to 12 carbon atoms per molecule with those of 4–8 carbon atoms per molecule being more preferred. Examples of these monomers include 1,3-butadiene, isoprene, 2,3-dimethyl-1,3-butadiene, piperylene, 3-butyl-1,3-octadiene and 2-phenyl-1,3-butadiene. The generally preferred monovinylarenes contain 8–20, and more preferably 8–12, carbon atoms per molecule. Examples include styrene, alpha-methylstyrene, 1-vinylnaphthalene, 2-vinylnaphthalene and alkyl, cycloalkyl, aryl, alkaryl and aralkyl derivatives thereof. Examples of substituted mononers include 3-methylstyrene, 4-n-propylstyrene, 4-cyclohexylstyrene, 4-dodecylstyrene, 3-ethyl-4-benzylstyrene, 4-p-tolylstyrene and 4-(4-phenyl-n-butyl)styrene. The weight ratio of conjugated diene:monovinylarene is such that the copolymer is resinous and usually will be in the range of about 45:55 to 1:99.

The most preferred conjugated diene-monovinylarene copolymers of my invention are the substantially radially branched butadiene-styrene copolymers marketed by Phillips Petroleum Company under the trademark K-Resin having a bound styrene content varying from about 60 percent by weight to about 90 percent by weight. Currently, the most preferred of these copolymers have a bound styrene content varying from 66 to 76 weight percent.

The vinylarene-olefinically unsaturated nitrile copolymers encompassed within the scope of this invention can be prepared by copolymerizing at least one vinylarene with at least one olefinically unsaturated nitrile. Examples of suitable vinylarene monomers include styrene, alpha-methylstyrene, o-, m-, and p-vinyltoluene, 2,4-dimethylstyrene, 2,4-diethylstyrene, 2-chlorostyrene, 2-chloro-5-methylstyrene, vinylnaphthalene and the like and mixtures thereof. The olefinically unsaturated nitrile should have the following structure

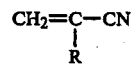

wherein R is hydrogen, an alkyl group having from 1–6 carbon atoms or a halogen. Examples of suitable nitriles include acrylonitrile, alpha-chloroacrylonitrile, alpha-fluoroacrylonitrile, methacrylonitrile, ethyacrylonitrile and the like and mixtures thereof.

The currently preferred vinylarene-olefinically unsaturated nitrile copolymers are the styrene-acrylonitrile copolymers having a bound styrene content of 50–90 weight percent. The most preferred copolymer is manufactured by Dow Chemical Company under the trademark Tyril 860 and has a bound styrene content of 75 weight percent and a bound acrylonitrile content of 25 weight percent.

The weight ratio of conjugated diene-vinylarene copolymer to vinylarene-olefinically unsaturated nitrile copolymer in the inventive blend generally will vary from about 99:1 to about 70:30. A finite lower limit is not placed on the amount of vinylarene-olefinically unsaturated nitrile copolymer present in the blend, the only requirement being that at least an impact resistance improving amount be employed.

The inventive blends can be prepared by any suitable mixing means, such as dry-blending, melt-blending or solution-blending. The preferred, least expensive mode of operation is dry-blending of the components, e.g., in a drum tumbler. Molding of the inventive blends can be carried out by any of the well known molding techniques, such as injection molding.

The inventive blend can optionally contain processing aids, antiblocking agents, thermal stabilizers, antioxidants and other known additives or fillers. These additional materials may be present in either of the copolymers before blending or may be added during or after the blending of the copolymers. The practitioner should be alert to possible adverse effects of additional material on the impact resistance of the blend but such adverse effects are not generally contemplated.

The following examples are intended to further illustrate the invention. Particular materials, ratios and procedures should be considered exemplary and not interpreted to limit the scope of this invention.

EXAMPLE I

In this example, the preparation of a resinous polymodal radially branched butadiene-styrene copolymer is described. This copolymer was prepared in a pilot K-Resin (Trademark) plant of Phillips Petroleum Company and later used for preparing the inventive blends.

After charging 400 lb. of cyclohexane and 0.05 lb of tetrahydrofuran to an agitated reactor 0.06 lb of n-butyllithium initiator was added and followed by a first styrene charge of 59 lb. The temperature was raised from about 50° C. to about 80° C. over a time interval of about 4 minutes after the styrene charge. About 21 minutes after the first styrene charge a second styrene charge of 33 lb. was added after briefly cooling the reactor down about 20° C. A third styrene charge (40 lb) and a second n-butyllithium charge (0.32 lb) followed after a brief cooling down period. A third peak temperature of about 87° C. was reached 32 minutes after the first styrene charge. The reactor pressure during these reaction stages was about 21-24 psig. About 50 minutes after the start of the polymerization reaction 68 lb of butadiene were added. The temperature and pressure were raised to about 100° C. and about 45 psig, respectively, over a period of about 5 minutes and then 1.0 lb of Admex ® 711, an epoxidized soybean oil coupling agent marketed by Sherex Chemical Company, was added.

The copolymer solution was transferred to a blowdown vessel to which 0.8 lb of water plus 0.8 lb of $CO_2$ were charged as terminating agents. 1.9 lb of BHT (2,6-di-t-butyl-p-cresol) and 1.3 lb of TNPP (tris-nonyl-triphenyl phosphite) were added as antioxidants and 0.5 lb of a microcrystalline paraffin wax was added as an anti-blocking agent. Finally, the copolymer was recovered by solvent removal in a film evaporator and a devolatilizing extruder. The polymer melt flow of the prepared resinous polymodal branched copolymer was 7.0 g/10 min. at 200° C. (ASTM D 1238, Condition G). The copolymer had a butadiene:styrene weight ratio of 34:66.

EXAMPLE II

Pellets of the resinous polymodal butadiene-styrene copolymer of Example I having a bound styrene content of 66 weight percent were dry-blended by tumbling in a plastic bag for 60 seconds with various amounts of pelletized Tyril ® 860, a styrene-acrylonitrile copolymer having a bound styrene content of about 25 percent by weight, a melt flow of 9.5 g/10 min. (ASTM D 1238, Condition I), a specific gravity of 1.08 and a Vicat softening temperature of 227° F. (ASTM D 1525). Tyril ® 860 is marketed by Dow Chemical Company, Midland, Mich.

Dry-mixed blends were molded in an Arburg 221 E/150, 1½ ounce molding machine at a barrel temperature of about 200° C., a mold temperature of about 50° C., a screw speed of about 120 r.p.m., an injection pressure ranging from 43 to 82 MPa and a total cycle time of 35 seconds.

Molded disks having a thickness of about 56–60 mils (1.43–1.52 mm) made of inventive and control blends containing resinous butadiene-styrene copolymer and styrene-acrylonitrile copolymer were tested in a Gardner IG-1120 heavy-duty impact tester according to a modified ASTM D2440-70 procedure described in the IG-1120 manual of Gardner Laboratories, Bethesda, Md. All tests were carried out with a 4-lb weight and a 40-inch guide tube slot at room temperature for determining impact energy, which is divided by the specimen thickness in millimeters to give impact values in units of cm-Kg/mm. Imact data are listed in Table I.

TABLE I

| Run | Weight-% of K-Resin ®[1] | Weight-% of Tyril ® 860[2] | Weight-% of Butadiene in Blend[3] | Gardner Impact[4] (cm. Kg/mm) |
|---|---|---|---|---|
| 1 (Control) | 100 | 0 | 34 | 56 |
| 2 (Invention) | 88.8 | 11.2 | 30.2 | 67 |
| 3 (Invention) | 75.0 | 25.0 | 25.5 | 68 |
| 4 (Invention) | 70.6 | 29.4 | 24.0 | 58 |
| 5 (Control) | 58.8 | 41.2 | 20.0 | 36 |
| 6 (Control) | 50.0 | 50.0 | 17.0 | 10 |
| 7 (Control) | 25.0 | 75.0 | 8.5 | less than 1 |
| 8 (Control) | 0 | 100.0 | 0 | less than 1 |

[1] A resinous polymodal radial butadiene-styrene copolymer having a bound butadiene content of 34 percent by weight.
[2] A styrene - acrylonitrile copolymer having a bound styrene content of 25 percent by weight.
[3] $\frac{\text{weight-\% K-Resin ® in blend}}{100}$ × weight-% bound butadiene in K-Resin ®
[4] Determined according to the modified ASTM D2444-70 procedure described in Gardner Laboratories IG-1120 manual, using a 4-lb weight.

Data in Table I surprisingly show that the addition of up to nearly 30 weight percent of a low-impact resin (Tyril ® 860) to a high-impact resin (K-Resin ®) improves the impact resistance of the latter. This novel use of a small amount of a vinylarene-olefinically unsaturated nitrile copolymer to improve impact resistance represents a contribution to the art.

We have attempted herein to fully and accurately describe our invention and to set forth the presently contemplated best mode of operation. Reasonable variations from and modifications of this disclosure, not departing from the essence of our invention, are also contemplated to be within the scope of patent protection desired and sought.

I claim:
1. A composition comprising:
    (a) resinous, non-elastomeric block copolymer of conjugated diene and vinylarene and (b) copolymer of monovinylarene and olefinically unsaturated nitrile having the structure

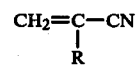

wherein R is a member of the group consisting of hydrogen, an alkyl group having from 1-6 carbon atoms and a halogen; and wherein the amount of (b) in said composition ranges up to about 30 weight percent based upon the total weight of (a) and (b).

2. A composition in accordance with claim 1 wherein the amount of (b) in said composition is an impact resistance improving amount.

3. A composition in accordance with claim 1 wherein (a) is butadiene-styrene copolymer.

4. A composition in accordance with claim 3 wherein (b) is styrene-acrylonitrile copolymer.

5. A composition in accordance with claim 3 or 4 wherein said butadiene-styrene copolymer has a bound styrene content of about 60 to about 90 weight percent based upon total weight of said butadiene-styrene copolymer.

6. A composition in accordance with claim 4 wherein said styrene-acrylonitrile copolymer has a bound styrene content of about 50 to about 90 weight percent based upon total weight of said styrene-acrylonitrile copolymer.

7. A composition in accordance with claim 5 wherein said styrene-acrylonitrile copolymer has a bound styrene content of about 50 to about 90 weight percent based upon total weight of said styrene-acrylonitrile copolymer.

8. A method for improving the impact resistance of a resinous, non-elastomeric block copolymer of conjugated diene and vinylarene comprising blending said resinous, non-elastomeric block copolymer with up to 30 weight percent of a copolymer of monovinylarene and olefinically unsaturated nitrile having the structure

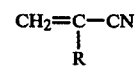

wherein R is a member of the group consisting of hydrogen, an alkyl group having from 1-6 carbon atoms and a halogen; and wherein said weight percent is based upon the total weight of said copolymers.

9. A method in accordance with claim 8 wherein said resinous, non-elastomeric block copolymer is butadiene-styrene copolymer.

10. A method in accordance with claim 8 wherein said copolymer of monovinylarene and olefinically unsaturated nitrile is styrene-acrylonitrile copolymer.

11. A method in accordance with claim 9 wherein said copolymer of monovinylarene and olefinically unsaturated nitrile is styrene-acrylonitrile copolymer.

12. A method in accordance with claim 9 or 11 wherein said butadiene-styrene copolymer has a bound styrene content of about 60 to about 90 weight percent based upon total weight of said butadiene-styrene copolymer.

13. A method in accordance with claim 12 wherein said styrene-acrylonitrile copolymer has a bound styrene content of about 50 to about 90 weight percent based upon total weight of said styrene-acrylonitrile copolymer.

* * * * *